United States Patent
Kim

(10) Patent No.: US 8,446,538 B2
(45) Date of Patent: May 21, 2013

(54) DISPLAY SUBSTRATE AND DISPLAY APPARATUS HAVING THE SAME

(75) Inventor: Dong-Gyu Kim, Yongin-si (KR)

(73) Assignee: Samsung Display Co., Ltd., Yongin (KR)

( * ) Notice: Subject to any disclaimer, the term of this patent is extended or adjusted under 35 U.S.C. 154(b) by 596 days.

(21) Appl. No.: 12/689,067

(22) Filed: Jan. 18, 2010

(65) Prior Publication Data

US 2010/0238369 A1    Sep. 23, 2010

(30) Foreign Application Priority Data

Mar. 23, 2009 (KR) ........................ 10-2009-0024261

(51) Int. Cl.
*G02F 1/1365* (2006.01)
*G02F 1/1343* (2006.01)

(52) U.S. Cl.
USPC ............................. 349/48; 349/139; 349/144

(58) Field of Classification Search
USPC ........................................................ 349/48
See application file for complete search history.

(56) References Cited

U.S. PATENT DOCUMENTS

| | | | | |
|---|---|---|---|---|
| 6,040,882 A * | 3/2000 | Jun et al. | ........................ | 349/39 |
| 7,554,630 B2 * | 6/2009 | Kwon et al. | .................. | 349/111 |
| 2006/0164352 A1 * | 7/2006 | Yoo et al. | ........................ | 345/87 |
| 2006/0208984 A1 * | 9/2006 | Kim et al. | ........................ | 345/90 |
| 2007/0165149 A1 * | 7/2007 | Kim et al. | ........................ | 349/39 |
| 2009/0027581 A1 * | 1/2009 | You et al. | ........................ | 349/48 |
| 2009/0140253 A1 * | 6/2009 | Kasahara | ........................ | 257/59 |
| 2009/0168004 A1 * | 7/2009 | Kim et al. | ..................... | 349/139 |
| 2012/0268679 A1 * | 10/2012 | Song et al. | ..................... | 349/42 |

FOREIGN PATENT DOCUMENTS

| | | |
|---|---|---|
| JP | 2003-330037 | 11/2003 |
| KR | 1020080020337 | 3/2008 |
| KR | 1020080076466 | 8/2008 |

\* cited by examiner

*Primary Examiner* — Michelle R Connelly
(74) *Attorney, Agent, or Firm* — H.C. Park & Associates, PLC

(57) ABSTRACT

A display substrate may include a substrate, a first pixel electrode, a first switching element, and a second switching element. The first pixel electrode may be disposed in a first pixel area of the substrate and may include high and low electrodes. Short sides of the first pixel area may be defined by first and second data lines adjacent to one other. A long side of the first pixel area may be defined by a first gate line. The high electrode may be adjacent to the first data line, and the low electrode may be adjacent to the second data line. The first switching element may be electrically connected to the first gate line and the first data line, and may contact the high electrode. The second switching element may be electrically connected to the first gate line and the second data line, and may contact the low electrode.

21 Claims, 5 Drawing Sheets

DISPLAY SUBSTRATE AND DISPLAY APPARATUS HAVING THE SAME

CROSS REFERENCE TO RELATED APPLICATION

This application claims priority from and the benefit of Korean Patent Application No. 10-2009-0024261, filed on Mar. 23, 2009, which is hereby incorporated by reference for all purposes as if fully set forth herein.

BACKGROUND OF THE INVENTION

1. Field of the Invention

Exemplary embodiments of the present invention relate to a display substrate and a display apparatus having the display substrate. In particular, exemplary embodiments of the present invention relate to a display substrate for a liquid crystal display (LCD) apparatus.

2. Description of the Background

Generally, a liquid crystal display (LCD) apparatus includes a display substrate having switching elements driving pixel areas, an opposite substrate facing the display substrate, and a liquid crystal layer disposed between the display substrate and the opposite substrate. The LCD apparatus displays an image according to light transmittance which changes according to voltages applied thereto.

An LCD apparatus having a patterned vertical alignment (PVA) mode has been developed for securing a wide viewing angle by arranging liquid crystal molecules into different directions using a patterned transparent electrode and forming a liquid crystal domain. The method for manufacturing the LCD apparatus having the PVA mode includes forming an opening portion through a pixel electrode of a lower substrate and forming an opening portion through a common electrode of an upper substrate. In addition, in assembling the upper and lower substrates, the pixel electrode having the opening portion and the common electrode having the opening portion should be accurately aligned with each other. However, achieving an ideal alignment in line with a designed structure is a difficult task.

The pixel electrode may be divided into two sub-electrodes and different voltages may be respectively applied to sub-electrodes to improve the side viewing angle of the LCD apparatus. For example, the side viewing angle of the LCD apparatus may be improved, when the pixel electrode includes a first sub-electrode to which a first voltage is applied and a second sub-electrode to which a second voltage higher than the first voltage is applied.

In the above example, two data lines are required for driving the LCD because the first voltage and the second voltage may be applied to one pixel. For pixels including n different colors, 2n data lines are required for applying the first voltage and the second voltage to each pixel. That is, the number of the data lines increases by at least two times the number of the data lines required for conventionally driving the pixels. The conventional structure for driving pixels typically has n data lines corresponding to n different colors for applying voltage to each pixel. Since the number of data driving chips required for driving the data lines within a limited area of the LCD apparatus is increased and the number of circuits electrically connected to the data lines and integrated on the LCD apparatus is increased, the design at a peripheral area surrounding a display area of the LCD apparatus may become complicated.

SUMMARY OF THE INVENTION

Exemplary embodiments of the present invention provide a display apparatus having a display substrate capable of improving an aperture ratio and visibility.

Additional features of the invention will be set forth in the description which follows, and in part will be apparent from the description, or may be learned by practice of the invention.

Exemplary embodiments of the present invention disclose a display substrate comprising a substrate, a first pixel electrode, a first switching element, and a second switching element. The substrate comprises a plurality of pixel areas. The first pixel electrode is disposed in a first pixel area of the substrate. The first pixel electrode comprises a high electrode and a low electrode. A first side of the first pixel area being defined by a first gate line. At least two sides of the first pixel area are shorter than the first side and are defined by a first data line and a second data line adjacent to the first data line. The high electrode is adjacent to the first data line. The low electrode is adjacent to the second data line. The first switching element is electrically connected to the first gate line, the first data line, and the high electrode of the first pixel electrode. The second switching element is electrically connected to the first gate line, the second data line, and the low electrode of the first pixel electrode.

Exemplary embodiments of the present invention also disclose a display apparatus comprises a display substrate and a common electrode. The display substrate comprises a first substrate, a first pixel electrode, a first switching element, and a second switching element. The first substrate comprises a plurality of pixel areas. The first pixel electrode is disposed in a first pixel area of the first substrate. The first pixel electrode comprises a high electrode and a low electrode. At least two sides of the first pixel area are defined by a first data line and a second data line adjacent to the first data line. At least one side of the first pixel area is longer than the at least two sides of the first pixel area and is defined by a first gate line. The high electrode is adjacent to the first data line. The low electrode is adjacent to the second data line. The first switching element is electrically connected to the first gate line, the first data line, and the high electrode of the first pixel electrode. The second switching element is electrically connected to the first gate line, the second data line, and the low electrode of the first pixel electrode. The common electrode layer is disposed on a second substrate facing the first display substrate.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the principles of the invention.

DETAILED DESCRIPTION OF THE ILLUSTRATIVE EMBODIMENTS

Figure 1:
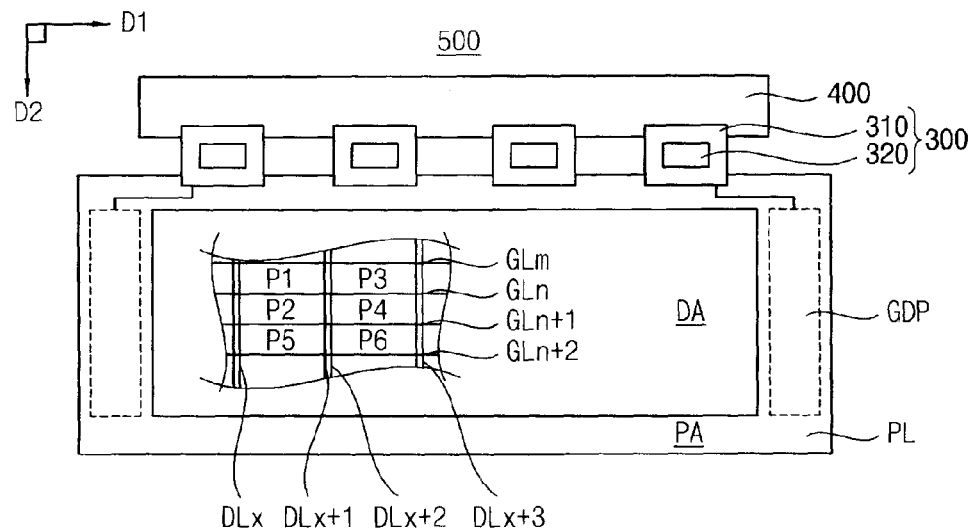
FIG. 1 is a plan view illustrating a display apparatus according to exemplary embodiments of the present invention.

The present invention is described more fully hereinafter with reference to the accompanying drawings, in which exemplary embodiments of the present invention are shown. The present invention may, however, be embodied in many different forms and should not be construed as limited to the exemplary embodiments set forth herein. Rather, these exemplary embodiments are provided so that this disclosure will be thorough and complete, and will fully convey the scope of the present invention to those skilled in the art. In the drawings, the sizes and relative sizes of layers and regions may be exaggerated for clarity.

It will be understood that when an element or layer is referred to as being "on," "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numerals refer to like elements throughout. As used herein, the term "and/or" includes any and all combinations of one or more of the associated listed items.

It will be understood that, although the terms first, second, third, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular exemplary embodiments only and is not intended to be limiting of the present invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Exemplary embodiments of the invention are described herein with reference to cross-sectional illustrations that are schematic illustrations of idealized exemplary embodiments (and intermediate structures) of the present invention. As such, variations from the shapes of the illustrations as a result, for example, of manufacturing techniques and/or tolerances, are to be expected. Thus, exemplary embodiments of the present invention should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the present invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the present invention will be explained in detail with reference to the accompanying drawings.

A display apparatus according to exemplary embodiments of the present invention will be described with reference to FIG. 1 and pixel areas aligned in a display area will be described in detail with reference to FIG. 1, FIG. 2, and FIG. 3.

FIG. 1 is a plan view illustrating a display apparatus according to exemplary embodiments of the present invention.

Referring to FIG. 1, the display apparatus 500 may include a display panel PL for displaying an image, a gate driving part GDP, a data driving part 300, and a controlling part 400.

The display panel PL may include a display substrate including a plurality of pixel areas and an opposite substrate facing the display substrate. An image may be displayed by a display element formed between the display substrate and the opposite substrate. For example, the display element may be a liquid crystal material.

The display substrate may be substantially disposed in a display area DA displaying the image, and may include a first signal wiring extended along a first direction D1 and a second signal wiring extended along a second direction D2 different from the first direction D1. The second direction D2 may be substantially perpendicular to the first direction D1. The first signal wiring may cross the second signal wiring to define pixel areas in the display substrate. In some cases, the pixel areas may include, for example, first, second, third, fourth, fifth, and sixth pixel areas P1, P2, P3, P4, P5, and P6. The display area DA may not be limited to the first, second, third, fourth, fifth, and sixth pixel areas P1, P2, P3, P4, P5, and P6, and may include any number of suitable pixel areas having, in some cases, configurations similar to those defined in first, second, third, fourth, fifth, and sixth pixel areas P1, P2, P3, P4, P5, and P6 as described further below.

The first signal wiring may include n-th, (n+1)-th, (n+2)-th, and m-th gate lines $GL_n$, $GL_{n+1}$, $GL_{n+2}$, and $GL_m$. Here, n and m may be natural numbers. The n-th, (n+1)-th, (n+2)-th, and m-th gate lines $GL_n$, $GL_{n+1}$, $GL_{n+2}$, and $GL_m$ may be aligned substantially parallel to each other along the first direction D1. The n-th, (n+1)-th, (n+2)-th, and m-th gate lines $GL_n$, $GL_{n+1}$, $GL_{n+2}$, and $GL_m$ may be aligned with substantially the same interval along the second direction D2. The second signal wiring may include x-th, (x+1)-th, (x+2)-th, and (x+3)-th data lines $DL_x$, $DL_{x+1}$, $DL_{x+2}$, and $DL_{x+3}$. x may be a whole number. The x-th, (x+1)-th, (x+2)-th, and (x+3)-th data lines $DL_x$, $DL_{x+1}$, $DL_{x+2}$, and $DL_{x+3}$ may be aligned substantially parallel to each other along the second direction D2.

The gate driving part GDP may be formed on the display panel PL. The gate driving part GDP may be formed in the peripheral area PA. In some cases, the gate driving part GDP may be formed on both sides of the display area DA. The gate driving part GDP may be electrically connected to the n-th, (n+1)-th, (n+2)-th, and m-th gate lines $GL_n$, $GL_{n+1}$, $GL_{n+2}$, and $GL_m$, and may transmit a gate driving signal to each of the n-th, (n+1)-th, (n+2)-th, and m-th gate lines $GL_n$, $GL_{n+1}$, $GL_{n+2}$, and $GL_m$. The gate driving part GDP may be formed directly on the display panel PL while forming the n-th, (n+1)-th, (n+2)-th and m-th gate lines $GL_n$, $GL_{n+1}$, $GL_{n+2}$, and $GL_m$ and the x-th, (x+1)-th, (x+2)-th, and (x+3)-th data lines $DL_x$, $DL_{x+1}$, $DL_{x+2}$, and $DL_{x+3}$ in the display area DA.

The data driving part 300 may include a data driving chip 320 mounted on a base film 310 that is connected to the display panel PL. The data driving chip 320 may be electrically connected to the circuits formed on the base film 310, and the base film 310 may be physically and/or electrically connected to the display panel PL. Therefore, the data driving part 300 may be electrically connected to the x-th, (x+1)-th, (x+2)-th, and (x+3)-th data lines $DL_x$, $DL_{x+1}$, $DL_{x+2}$, and $DL_{x+3}$. The data driving part 300 may transmit a data driving signal to each of the x-th, (x+1)-th, (x+2)-th, and (x+3)-th data lines $DL_x$, $DL_{x+1}$, $DL_{x+2}$, and $DL_{x+3}$.

The controlling part 400 may be physically and/or electrically connected to the data driving chip 320 and the display panel PL via the base film 310. The controlling part 400 may be physically and/or electrically connected to the data driving chip 320 and the gate driving part GDP.

Figure 2:
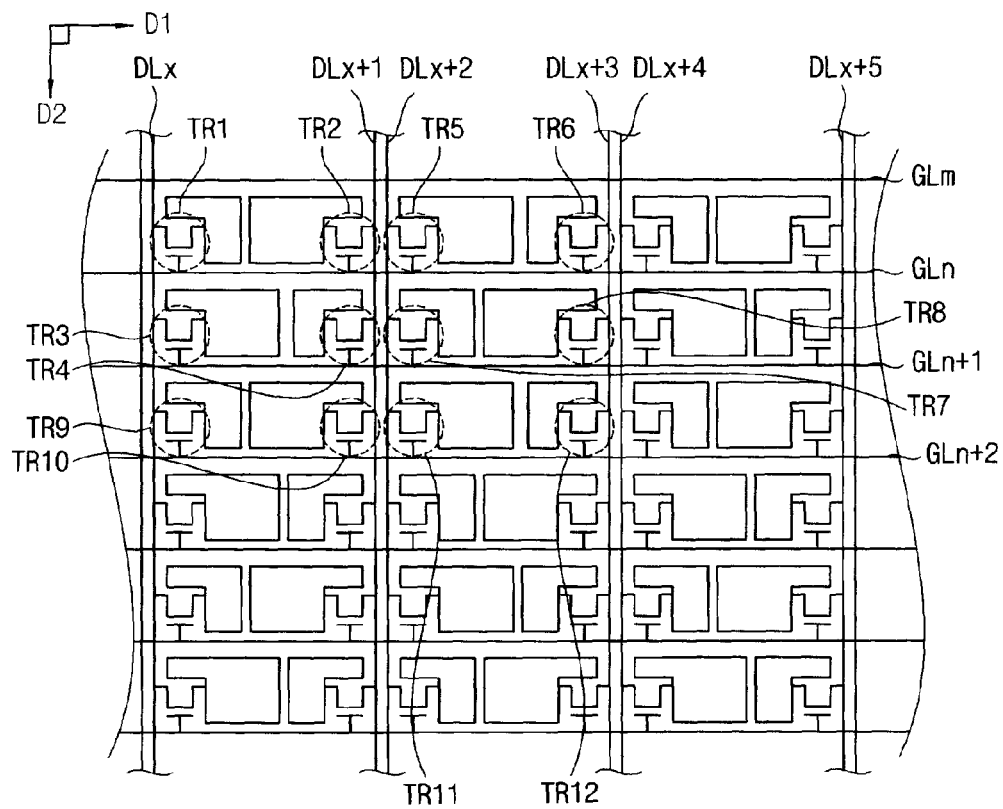
FIG. 2 is a schematic diagram illustrating the display substrate in FIG. 1 according to exemplary embodiments of the present invention.

FIG. 2 is a diagram illustrating the display substrate in FIG. 1 according to exemplary embodiments of the present invention.

Referring to FIG. 1 and FIG. 2, the first pixel area P1 may be defined by the n-th and m-th gate lines $GL_n$ and $GL_m$ and the x-th and (x+1)-th data lines $DL_x$ and $DL_{x+1}$. For example, the n-th and m-th gate lines $GL_n$ and $GL_m$ may define the long sides of the first pixel area P1, and the x-th and (x+1)-th data lines $DL_x$ and $DL_{x+1}$ may define the short sides of the first pixel area P1.

The second pixel area P2 may be disposed adjacent to the first pixel area P1 along the second direction D2. The second pixel area P2 may be defined by the n-th and (n+1)-th gate lines $GL_n$ and $GL_{n+1}$ and the x-th and (x+1)-th data lines $DL_x$ and $DL_{x+1}$. For example, the n-th and (n+1)-th gate lines $GL_n$ and $GL_{n+1}$ may define the long sides of the second pixel area P2, and the x-th and (x+1)-th data lines $DL_x$ and $DL_{x+1}$ may define the short sides of the second pixel area P2.

The third pixel area P3 may be disposed adjacent to the first pixel area P1 along the first direction D1. The third pixel area P3 may be defined by the n-th and m-th gate lines $GL_n$ and $GL_m$ and the (x+2)-th and (x+3)-th data lines $DL_{x+2}$ and $DL_{x+3}$. For example, the n-th and m-th gate lines $GL_n$ and $GL_m$ may define the long sides of the third pixel area P3, and the (x+2)-th and (x+3)-th data lines $DL_{x+2}$ and $DL_{x+3}$ may define the short sides of the third pixel area P3.

The fourth pixel area P4 may be disposed adjacent to the third pixel area P3 along the second direction D2. The fourth pixel area P4 may be defined by the n-th and (n+1)-th gate lines $GL_n$ and $GL_{n+1}$ and the (x+2)-th and (x+3)-th data lines $DL_{x+2}$ and $DL_{x+3}$. For example, the n-th and (n+1)-th gate lines $GL_n$ and $GL_{n+1}$ may define the long sides of the fourth pixel area P4, and the (x+2)-th and (x+3)-th data lines $DL_{x+2}$ and $DL_{x+3}$ may define the short sides of the fourth pixel area P4.

The fifth pixel area P5 may be disposed adjacent to the second pixel area P2 along the second direction D2. The fifth pixel area P5 may be defined by the (n+1)-th and (n+2)-th gate lines $GL_{n+1}$ and $GL_{n+2}$ and the x-th and (x+1)-th data lines $DL_x$ and $DL_{x+1}$. For example, the (n+1)-th and (n+2)-th gate lines $GL_{n+1}$ and $GL_{n+2}$ may define the long sides of the fifth pixel area P5, and the x-th and (x+1)-th data lines $DL_x$ and $DL_{x+1}$ may define the short sides of the fifth pixel area P5.

The sixth pixel area P6 may be disposed adjacent to the fifth pixel area P5 along the first direction D1. The sixth pixel area P6 may be defined by the (n+1)-th and (n+2)-th gate lines $GL_{n+1}$ and $GL_{n+2}$ and the (x+2)-th and (x+3)-th data lines $DL_{x+2}$ and $DL_{x+3}$. For example, the (n+1)-th and (n+2)-th gate lines $GL_{n+1}$ and $GL_{n+2}$ may define the long sides of the sixth pixel area P6, and the (x+2)-th and (x+3)-th data lines $DL_{x+2}$ and $DL_{x+3}$ may define the short sides of the sixth pixel area P6.

Figure 3:
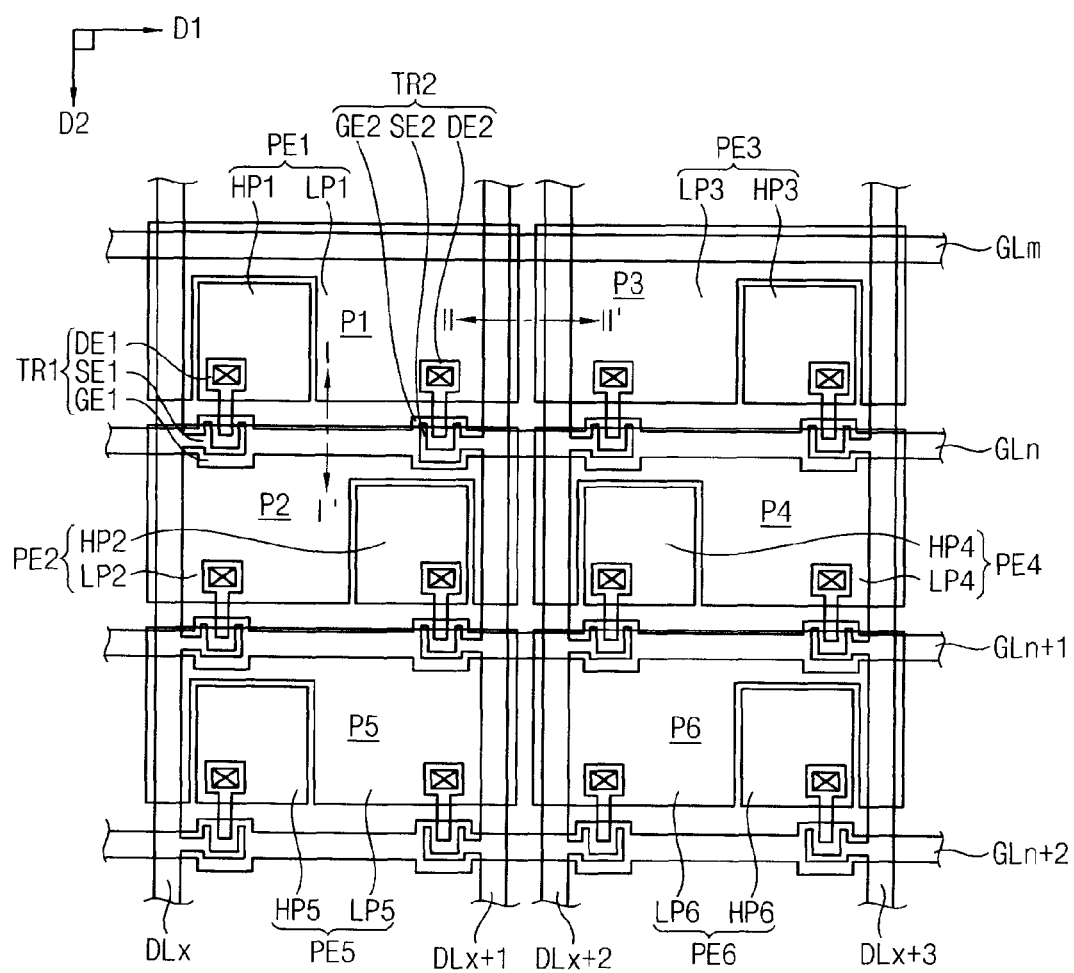
FIG. 3 is a plan view illustrating the display panel in FIG. 2 according to exemplary embodiments of the present invention.

FIG. 3 is a plan view illustrating the display panel in FIG. 2 according to exemplary embodiments of the present invention.

Referring to FIG. 2 and FIG. 3, a first transistor TR1, a second transistor TR2, and a first pixel electrode PE1 may be formed in the first pixel area P1.

The first transistor TR1 may be electrically connected to the n-th gate line $GL_n$ and the x-th data line $DL_x$. For example, the first transistor TR1 may include a first gate electrode GE1, first source and drain electrodes SE1 and DE1, and a first active pattern (not shown). The first gate electrode GE1 may be connected to the n-th gate line $GL_n$. The first source electrode SE1 may be connected to the x-th data line $DL_x$. The first transistor TR1 may be formed in an edge area where the n-th gate line $GL_n$ crosses the x-th data line $DL_x$.

The second transistor TR2 may be electrically connected to the n-th gate line $GL_n$ and the (x+1)-th data line $DL_{x+1}$. For example, the second transistor TR2 may include a second gate electrode GE2, second source and drain electrodes SE2 and DE2, and a second active pattern (not shown). The second gate electrode GE2 may be connected to the n-th gate line $GL_n$. The second source electrode SE2 may be electrically connected to the (x+1)-th data line $DL_{x+1}$. The second transistor TR2 may be formed in an edge area where the n-th gate line $GL_n$ crosses the (x+1)-th data line $DL_{x+1}$.

The first pixel electrode PE1 may include a first high electrode HP1 and a first low electrode LP1. The first high electrode HP1 may be electrically connected to the first transistor TR1. The first high electrode HP1 may be disposed adjacent to the x-th data line $DL_x$. The first low electrode LP1 may be electrically connected to the second transistor TR2. The first low electrode LP may be disposed adjacent to the (x+1)-th data line $DL_{x+1}$. The area of the first high electrode HP1 may be about half the area of the first low electrode LP1.

A third transistor TR3, a fourth transistor TR4, and a second pixel electrode PE2 may be formed in the second pixel area P2.

The third transistor TR3 may be electrically connected to the (n+1)-th gate line $GL_{n+1}$ and the x-th data line $DL_x$. The third transistor TR3 may be formed in an edge area where the (n+1)-th gate line $GL_{n+1}$ crosses the x-th data line $DL_x$. The fourth transistor TR4 may be electrically connected to the (n+1)-th gate line $GL_{n+1}$ and the (x+1)-th data line $DL_{x+1}$. The fourth transistor TR4 may be formed in an edge area where the (n+1)-th gate line $GL_{n+1}$ crosses the (x+1)-th data line $DL_{x+1}$. The third and fourth transistors TR3 and TR4 may be substantially the same as the first and second transistors TR1 and TR2, except that each control electrode of the third and fourth transistors TR3 and TR4 may be connected to the (n+1)-th gate line $GL_{n+1}$. Therefore, further repetitive descriptions will be omitted.

The second pixel electrode PE2 may include a second low electrode LP2 and a second high electrode HP2. The second low electrode LP2 may be electrically connected to the third transistor TR3. The second low electrode LP2 may be disposed adjacent to the x-th data line $DL_x$. The second high electrode HP2 may be electrically connected with the fourth transistor TR4. The second high electrode HP2 may be disposed adjacent to the (x+1)-th data line $DL_{x+1}$. For example, the second high electrode HP2 may be disposed along a diagonal direction with respect to the first high electrode HP1. The area of the second high electrode HP2 may be about half of the area of the second low electrode LP2.

A fifth transistor TR5, a sixth transistor TR6, and a third pixel electrode PE3 may be formed in the third pixel area P3.

The fifth transistor TR5 may be electrically connected to the n-th gate line $GL_n$ and the (x+2)-th data line $DL_{x+2}$. The fifth transistor TR5 may be formed in an edge area where the n-th gate line $GL_n$ crosses the (x+2)-th data line $DL_{x+2}$. The sixth transistor TR6 may be electrically connected to the n-th gate line $GL_n$ and the (x+3)-th data line $DL_{x+3}$. The sixth transistor TR6 may be formed in an edge area where the n-th gate line $GL_n$ crosses the (x+3)-th data line $DL_{x+3}$. The fifth and sixth transistors TR5 and TR6 may be substantially the same as the first and second transistors TR1 and TR2, except that the input electrodes of the fifth and sixth transistors TR5 and TR6 may be connected to the (x+2)-th data line $DL_{x+2}$ and the (x+3)-th data line $DL_{x+3}$. Therefore, further repetitive descriptions will be omitted.

The third pixel electrode PE3 may include a third high electrode HP3 and a third low electrode LP3. The third low electrode LP3 may be electrically connected to the fifth transistor TR5. The third low electrode LP3 may be disposed adjacent to the (x+2)-th data line $DL_{x+2}$. The third high electrode HP3 may be electrically connected to the sixth transistor TR6. The third high electrode HP3 may be disposed adjacent to the (x+3)-th data line $DL_{x+3}$. When the first high electrode HP1 and the first low electrode LP1 rotate about 180° with respect to the (x+1)-th and (x+2)-th data lines $DL_{x+1}$ and $DL_{x+2}$, the third high electrode HP3 and the third low electrode LP3 of the third pixel electrode PE3 may overlap with the first high electrode HP1 and the first low electrode LP1, respectively. The arrangement of the third high and low electrodes HP3 and LP3 of the third pixel electrode PE3 may be substantially the same as the arrangement of the second high and low electrodes HP2 and LP2 of the second pixel electrode PE2. The area of the third high electrode HP3 may be about half of the area of the third low electrode LP3.

A seventh transistor TR7, an eighth transistor TR8, and a fourth pixel electrode PE4 may be formed in the fourth pixel area P4.

The seventh transistor TR7 may be electrically connected to the (n+1)-th gate line $GL_{n+1}$ and the (x+2)-th data line $DL_{x+2}$. The seventh transistor TR7 may be formed in an edge area where the (n+1)-th gate line $GL_{n+1}$ crosses the (x+2)-th data line $DL_{x+2}$. The eighth transistor TR8 may be electrically connected to the (n+1)-th gate line $GL_{n+1}$ and the (x+3)-th data line $DL_{x+3}$. The eighth transistor TR8 may be formed in an edge area where the (n+1)-th gate line $GL_{n+1}$ crosses the (x+3)-th data line $DL_{x+3}$.

The fourth pixel electrode PE4 may include a fourth high electrode HP4 and a fourth low electrode LP4. The fourth high electrode HP4 may be electrically connected to the seventh transistor TR7. The fourth high electrode HP4 may be disposed adjacent to the (x+2)-th data line $DL_{x+2}$. The fourth low electrode LP4 may be electrically connected to the eighth transistor TR8. The fourth low electrode LP4 may be disposed adjacent to the (x+3)-th data line $DL_{x+3}$. The fourth high electrode HP4 may be disposed along a (reverse) diagonal direction with respect to the third high electrode HP3. When the second high electrode HP2 and the second low electrode LP2 rotate about 180° with respect to the (x+1)-th and (x+2)-th data lines $DL_{x+1}$ and $DL_{x+2}$, the fourth high electrode HP4 and the fourth low electrode LP4 of the fourth pixel electrode PE4 may overlap with the second high electrode HP2 and the second low electrode LP2, respectively. The arrangement of the fourth high and low electrodes HP4 and LP4 of the fourth pixel electrode PE4 may be substantially the same as the arrangement of the first high and low electrodes HP1 and LP1 of the first pixel electrode PE1. The area of the fourth high electrode HP4 may be about half of the area of the fourth low electrode LP4.

A ninth transistor TR9, a tenth transistor TR10, and a fifth pixel electrode PE5 may be formed in the fifth pixel area PE5.

The ninth transistor TR9 may be electrically connected to the (n+2)-th gate line $GL_{n+2}$ and the x-th data line $DL_x$. The tenth transistor TR10 may be electrically connected to the (n+2)-th gate line $GL_{n+2}$ and the (x+1)-th data line $DL_{x+1}$. The ninth and tenth transistors TR9 and TR10 may be substantially the same as the first and second transistors TR1 and TR2, except that each control electrode of the ninth and tenth transistors is connected to the (n+2)-th gate line $GL_{n+2}$ instead of the n-th gate line $GL_n$. Therefore, further repetitive descriptions will be omitted.

The fifth pixel electrode PE5 may include a fifth high electrode HP5 and a fifth low electrode LP5. The fifth high electrode HP5 may be electrically connected to the ninth transistor TR9 and the fifth low electrode LP5 may be electrically connected to the tenth transistor TR10. The fifth high electrode HP5 may be disposed adjacent to the x-th data line $DL_x$ and the fifth low electrode LP5 may be disposed adjacent to the (x+1)-th data line $DL_{x+1}$. The arrangement of the fifth high and low electrodes HP5 and LP5 of the fifth pixel electrode PE5 may be substantially the same as the arrangement of the first high and low electrodes HP1 and LP1 of the first pixel electrode PE1.

An eleventh transistor TR11, a twelfth transistor TR12, and a sixth pixel electrode PE6 may be formed in the sixth pixel area P6.

The eleventh transistor TR11 may be electrically connected to the (n+2)-th gate line $GL_{n+2}$ and the (x+2)-th data line $DL_{x+2}$. The eleventh transistor TR11 may be formed in an edge area where the (n+2)-th gate line $GL_{n+2}$ crosses the (x+2)-th data line $DL_{x+2}$. The twelfth transistor TR12 may be electrically connected to the (n+2)-th gate line $GL_{n+2}$ and the (x+3)-th data line $DL_{x+3}$. The twelfth transistor TR12 may be formed in an edge area where the (n+2)-th gate line $GL_{n+2}$ crosses the (x+3)-th data line $DL_{x+3}$.

The sixth pixel electrode PE6 may include a sixth low electrode LP6 and a sixth high electrode HP6. The sixth low electrode LP6 may be electrically connected to the eleventh transistor TR11. The sixth low electrode LP6 may be disposed adjacent to the (x+2)-th data line $DL_{x+2}$. The sixth high electrode HP6 may be electrically connected to the twelfth transistor TR12. The sixth high electrode HP6 may be disposed adjacent to the (x+3)-th data line $DL_{x+3}$. When the fifth high and low electrodes HP5 and LP5 rotate about 180° with respect to the (x+1)-th and (x+2)-th data lines $DL_{x+1}$ and $DL_{x+2}$, the sixth high electrode HP6 and the sixth low electrode LP6 of the sixth pixel electrode PE6 may overlap the fifth high and low electrodes HP5 and LP5, respectively. The arrangement of the sixth high and low electrodes HP6 and LP6 of the sixth pixel electrode PE6 may be substantially the same as the arrangement of the second high and low electrodes HP2 and LP2 of the second pixel electrode PE2. The area of the sixth high electrode HP6 may be about half of the area of the sixth low electrode LP6.

According to the description above, the first, second, and fifth pixel electrodes PE1, PE2, and PE5 may be repeatedly arranged along the second direction D2 among the first, second, third, fourth, fifth, and sixth pixel electrodes PE1, PE2, PE3, PE4, PE5, and PE6. For example, the first high electrode HP1, the second high electrode HP2, and the fifth high electrode HP5 may be aligned in zigzag pattern along the second direction D2. In addition, the first pixel electrode PE1 and the third pixel electrode PE3 (or the second pixel electrode PE2 and the fourth pixel electrode PE4, or the fifth pixel electrode PE5 and the sixth pixel electrode PE6) may be repeatedly arranged along the first direction D1.

At a low grayscale, the first, second, and/or fifth high electrodes HP1, HP2, and/or HP5 may be driven. However, display of a vertical stripe extended along the second direction D2 at the low grayscale may be prevented. In addition, the side viewing angle of the display panel 500 may be improved by applying each voltage having a different level to each high and/or low electrode of one pixel electrode. For example, a first voltage may be applied to a high electrode and a second voltage may be applied to a corresponding low electrode. In some cases, the first voltage may be higher than the second voltage.

Meanwhile, each of the first, second, third, fourth, fifth, and sixth pixel electrode PE1, PE2, PE3, PE4, PE5, and PE6 may include a micro-slit pattern. Even though the micro-slit pattern may be formed on the entire surface of the opposite substrate without patterning a common electrode layer (not shown) on the opposite substrate, a PVA mode may be embodied by changing the direction of an electric field between the first, second, third, fourth, fifth. and sixth pixel electrodes PE1, PE2, PE3, PE4, PE5, and PE6 and the common electrode layer. Accordingly, an additional process patterning the common electrode layer may not be necessary, thereby simplifying the manufacturing process of the common electrode. In FIG. 3, the micro-slit patterns of the first, second, third, fourth, fifth, and sixth pixel electrodes PE1, PE2, PE3, PE4, PE5, and PE6 are not shown in detail but are simplified. However, the first, second, third, fourth, fifth, and sixth pixel electrodes PE1, PE2, PE3, PE4, PE5, and PE6 may include the micro-slit patterns as illustrated in the first pixel electrode in FIG. 4.

Figure 4:
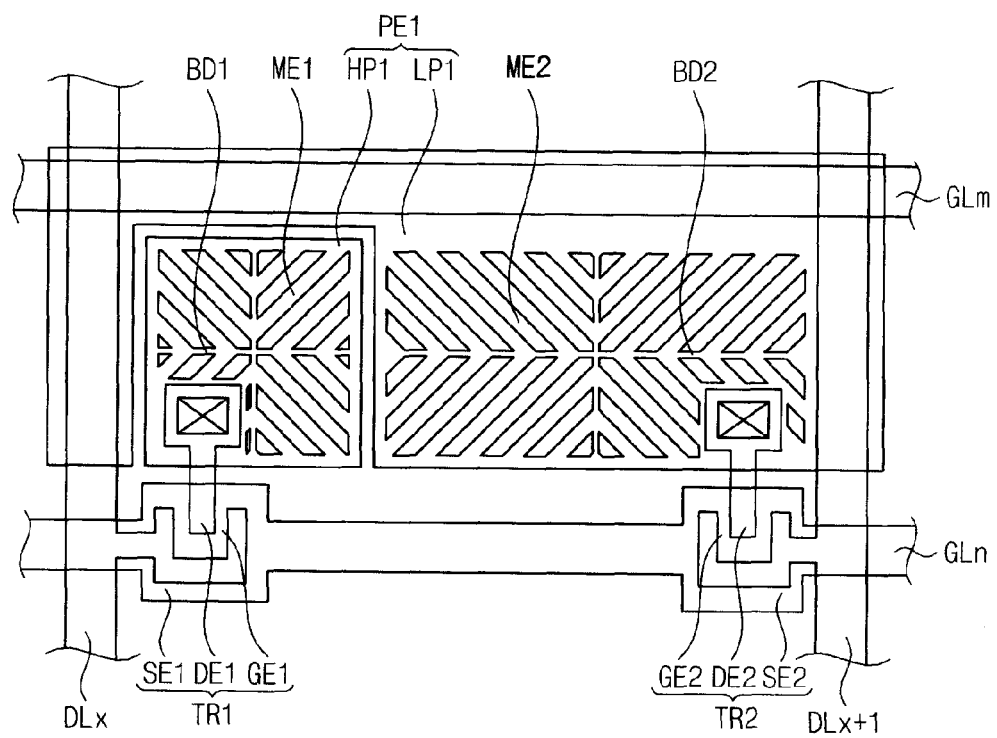
FIG. 4 is a partially enlarged view illustrating the display panel in FIG. 3 according to exemplary embodiments of the present invention.

FIG. 4 is a partially enlarged view illustrating the display panel in FIG. 3 according to exemplary embodiments of the present invention.

Referring to FIG. 3 and FIG. 4, each of the first high electrode HP1 and the first low electrode LP1 may have the micro-slit pattern.

For example, first micro-electrodes ME1 may form the micro-slits in the first high electrode HP1. The first micro-electrodes ME1 may be connected to a first body electrode BD1 formed in the first pixel area P1, and may branch from the first body electrode BD1. For example, the first body electrode BD1 may have a cross shape and the first micro-electrodes ME1 may extend in all directions from the first body electrode BD1.

Second micro-electrodes ME2 may form the micro-slits in the first low electrode LP1. The second micro-electrodes ME2 may be connected to a second body electrode BD2 formed in the second pixel area P2 and may branch from the second body electrode BD2.

Referring to FIG. 3, the first, second, third, fourth, fifth, and sixth low electrodes LP1, LP2, LP3, LP4, LP5, and LP6 may surround the first, second, third, fourth, fifth, and sixth high electrodes HP1, HP2, HP3, HP4, HP5, and HP6. For example, the first low electrode LP1 may surround the first high electrode HP1 in the first pixel electrode PE1.

Each of the first, second, third, fourth, fifth, and sixth low electrodes LP1, LP2, LP3, LP4, LP5, and LP6 may overlap a front gate line of a gate line connected with the respective transistor making contact with each low electrode. Each of the first, second, third, fourth, fifth, and sixth low electrodes LP1, LP2, LP3, LP4, LP5, and LP6 may overlap data lines surrounding the respective pixel electrode in which each low electrode is formed.

Each of the first, second, third, fourth, fifth, and sixth low electrodes LP1, LP2, LP3, LP4, LP5, and LP6 may have a rectangular shape and each of the first, second, third, fourth, fifth, and sixth low electrodes LP1, LP2, LP3, LP4, LP5, and LP6 may, in some cases, surround at least three sides of each of the first, second, third, fourth, fifth, and sixth high electrodes HP1, HP2, HP3, HP4, HP5, and HP6. It should be understood that the electrodes (e.g., pixel, low, and/or high) are not limited to rectangular shapes and may be implemented in any suitable shape or form.

A layout of the second low electrode LP2, the n-th gate line $GL_n$, and the x-th and (x+1)-th data lines $DL_x$ and $DL_{x+1}$ is described hereinafter with reference to FIG. 5 and FIG. 6. Even though the second pixel electrode PE2 may be described with reference to FIG. 5 and FIG. 6, the same layout may be applied for the first, third, fourth, fifth, and sixth pixel electrodes PE1, PE3, PE4, PE5, and PE6.

Figure 5:
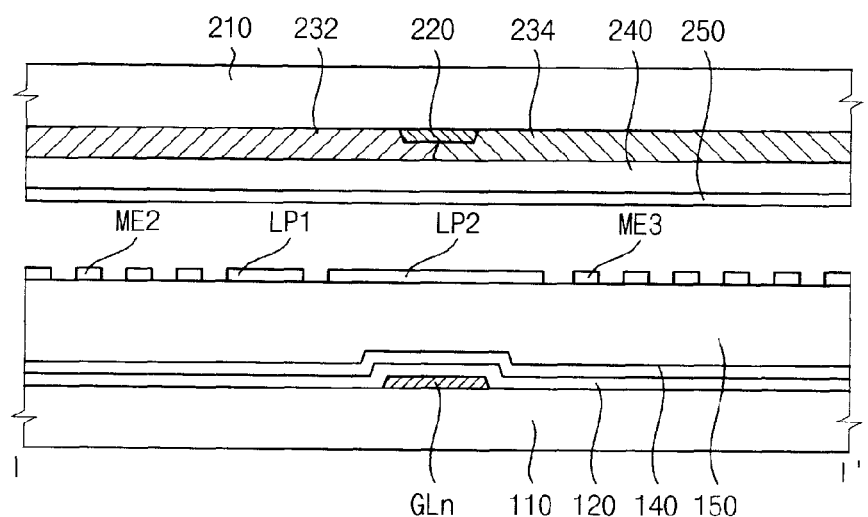
FIG. 5 is a cross-sectional view taken along a line I-I' in FIG. 3 according to exemplary embodiments of the present invention.

FIG. 5 is a cross-sectional view taken along a line I-I' in FIG. 3 according to exemplary embodiments of the present invention.

Referring to FIG. 3 and FIG. 5, the display substrate may include the n-th gate line $GL_n$, a gate insulating layer 120, a passivation layer 140, and an organic layer 150 disposed on a first substrate 110. The first, second, third, fourth, fifth and sixth pixel electrodes PE1, PE2, PE3, PE4, PE5 and PE6 may be formed on the organic layer 150.

The second high electrode HP2 may have a rectangular shape. The second low electrode LP2 may include a third micro-electrode ME3. The second low electrode LP2 may overlap the n-th gate line $GL_n$. The second low electrode LP2 may overlap with the n-th gate line $GL_n$, and may be disposed to surround two connected sides of the second high electrodes HP2. In some cases, the second low electrode LP2 may overlap the n-th gate line $GL_n$ to prevent an inflow of the electric field formed at the n-th gate line $GL_n$, which may be the front gate line.

The opposite substrate may include a light-blocking pattern 220, a first color filter 232, a second color filter 234, an overcoating layer 240, and a common electrode layer 250 which may be formed on a second substrate 210 facing the first substrate 110. The first color filter 232 may be formed in an area corresponding to the first and third pixel areas P1 and P3, and the second color filter 234 may be formed in an area corresponding to the second and fourth pixel areas P2 and P4. The opposite substrate may further include a third color filter (not shown) formed in an area corresponding to the fifth and sixth pixel electrodes P5 and P6. Therefore, the first and third pixel areas P1 and P3 may be defined as first color pixels, the second and fourth pixel areas P2 and P4 may be defined as second color pixels, and the fifth and sixth pixel areas P5 and P6 may be defined as third color pixels.

Figure 6:
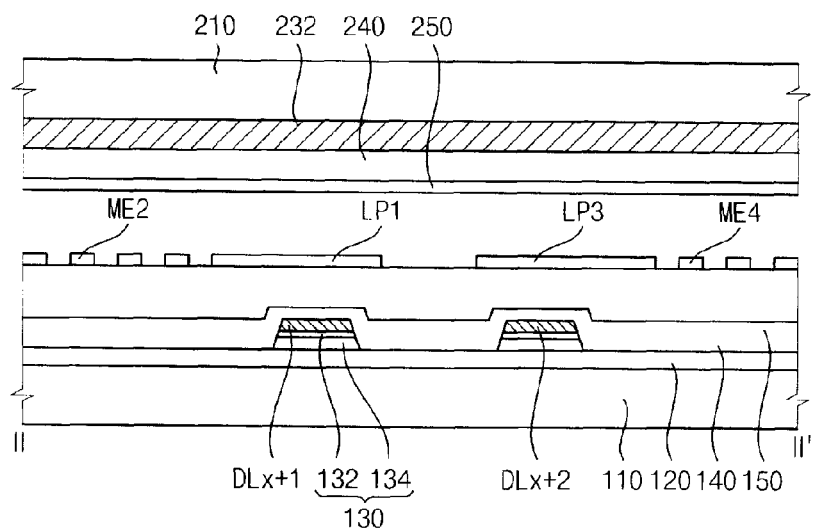
FIG. 6 is a cross-sectional view taken along a line II-IF in FIG. 3 according to exemplary embodiments of the present invention.

FIG. 6 is a cross-sectional view taken along a line II-IF in FIG. 3 according to exemplary embodiments of the present invention.

Referring to FIG. 3 and FIG. 6, the first low electrode LP1 may overlap each of the x-th and (x+1)-th data lines $DL_x$ and $DL_{x+1}$. For example, the first low electrode LP1 may overlap the x-th and (x+1)-th data lines $DL_x$ and $DL_{x+1}$ to prevent inflow of the electric field formed at the x-th and (x+1)-th data lines $DL_x$ and $DL_{x+1}$ to the first high electrode HP1.

In addition, the third low electrode LP3 may overlap each of the (x+2)-th and (x+3)-th data lines $DL_{x+2}$ and $DL_{x+3}$. The third low electrode LP3 may include a fourth micro-electrode ME4. For example, the third low electrode LP3 may overlap the (x+2)-th and (x+3)-th data lines $DL_{x+2}$ and $DL_{x+3}$ to prevent inflow of the electric field formed at (x+2)-th and (x+3)-th data lines $DL_{x+2}$ and $DL_{x+3}$ to the third high electrode HP3.

As mentioned above, the first, second, and third color filters 232 and 234 may be formed on the opposite substrate. In some cases, the first, second, and third color filters 232 and 234 may be formed on the display substrate.

A method of manufacturing the display substrate illustrated in FIG. 2, FIG. 3, FIG. 4, FIG. 5, and FIG. 6 will be described briefly hereinafter.

Referring to FIG. 5 and FIG. 6, a gate metal layer (not shown) may be formed on the first substrate 110 and subsequently patterned to form a gate pattern including the n-th, (n+1)-th, (n+2)-th, and m-th gate lines $GL_n$, $GL_{n+1}$, $GL_{n+2}$, and $GL_m$. The gate pattern may include control signals of the first to twelfth transistors TR1, TR2, TR3, TR4, TR5, TR6, TR7, TR8, TR9, TR10, TR11, and TR12 including the first gate electrode GE1 and the second gate electrode GE2.

The gate insulation layer 120, a semiconductor layer 132, an ohmic contact layer 134, and a data metal layer (not shown) may be subsequently formed on the first substrate 110 including the gate pattern formed on the first substrate 110. The data metal layer, the semiconductor layer 132, and the ohmic contact layer 134 may be patterned to form a silicon pattern 130 and a source pattern including the x-th, (x+1)-th, (x+2)-th, and (x+3)-th data lines $DL_x$, $DL_{x+1}$, $DL_{x+2}$, and $DL_{x+3}$. The source pattern may include input/output electrodes of the first to twelfth transistors TR1, TR2, TR3, TR4, TR5, TR6, TR7, TR8, TR9, TR10, TR11, and TR12 including the first source/drain electrodes SE1 and DE1 and the second source/drain electrodes SE2 and DE2.

The passivation layer 140 and the organic layer 150 may be subsequently formed on the first substrate 110 including the source pattern formed on the first substrate 110. Contact holes exposing one terminal of the output electrode of each of the first to twelfth transistors TR1, TR2, TR3, TR4, TR5, TR6, TR7, TR8, TR9, TR10, TR11, and TR12 may be formed.

The first to sixth pixel electrodes PE1, PE2, PE3, PE4, PE5 and PE6 may be formed on the organic layer 150 including the contact holes.

Although not shown in the figure, in some cases, a first alignment layer may be formed on the first substrate 110 and accordingly a display substrate may be manufactured.

According to exemplary embodiments, a liquid crystal composition may be disposed on the display substrate between the display substrate and an opposite substrate. The opposite substrate may include a second alignment layer (not shown) facing the first alignment layer and formed on the common electrode layer. In some cases, the common electrode layer 250 may be formed on the entire surface of the opposite substrate without an additional patterning process. In some cases, the common electrode layer 250 is formed on part of the opposite substrate. The liquid crystal composition may include a liquid crystal compound and a reactive mesogen.

When a voltage is applied to the display substrate and a second voltage is applied to the opposite substrate, an electric field may be generated between the display and opposite substrates. Liquid crystal compound may be pretilted along the generated electric field, and consequently the display substrate and the opposite substrate may be exposed to light thereby curing the reactive mesogen. Liquid crystal compounds adjacent to the surface of the first and second alignment layers may be fixed onto the first and second alignment layers to maintain the pretilted state. Accordingly, a display apparatus according to the manufacturing method described above may be manufactured, and the alignment reliability of the liquid crystal compound may be improved.

As described above, an aperture ratio may be improved using a horizontal stripe-type pixel structure, in which the gate lines define the long side of the pixel area. In addition, visibility may be improved by applying different voltages to two transistors connected with one gate line and a pair of data lines, respectively.

The display of a vertical stripe by the low electrodes at a low grayscale when the voltage is applied only to the high electrodes may be prevented by arranging, in a zigzag pattern, the high electrodes along an extended direction of the data lines. Therefore, the display quality of the display apparatus may be improved.

In addition, the number of the data driving chips for driving the display panel including the vertical stripe type pixel electrode may be reduced by applying a horizontal stripe-type pixel structure.

Figure 7:
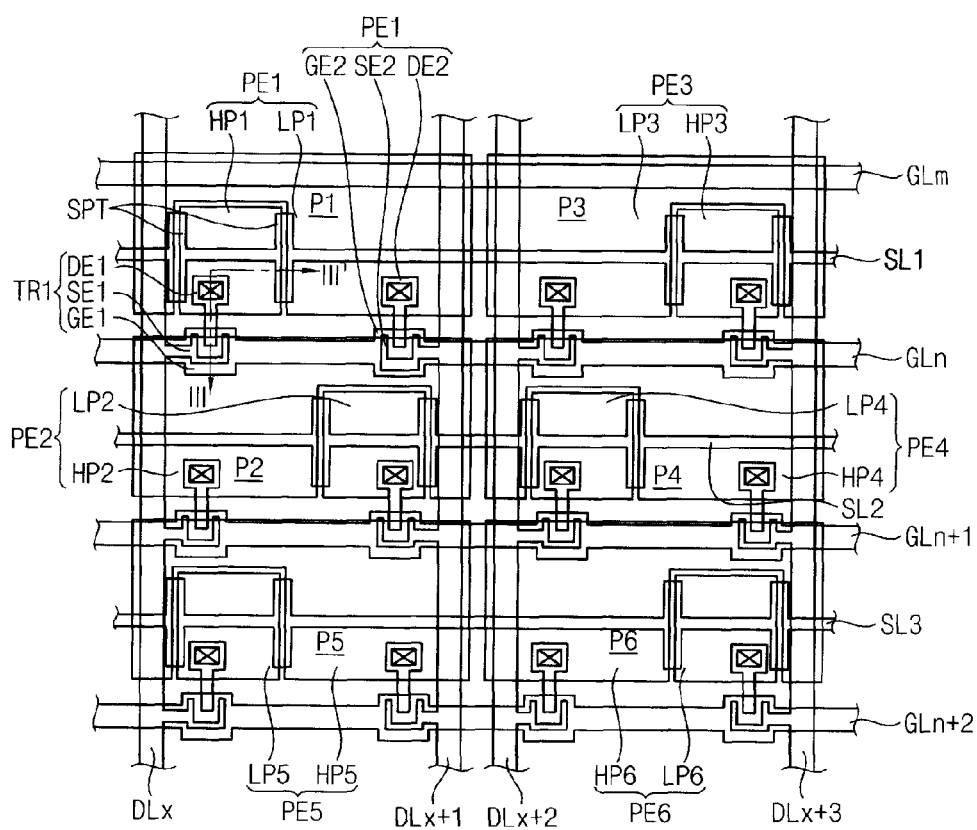
FIG. 7 is a plan view illustrating a display panel according to exemplary embodiments of the present invention.

FIG. 7 is a plan view illustrating a display panel according to some exemplary embodiments of the present invention.

Figure 8:
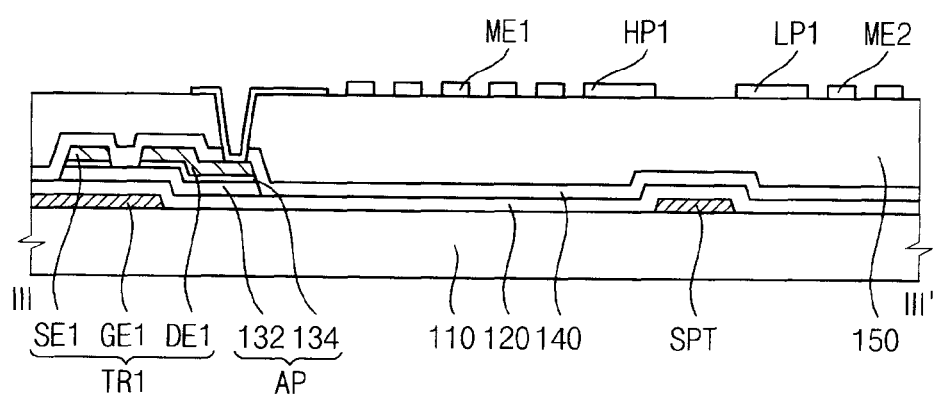
FIG. 8 is a cross-sectional view taken along a line III-III' in FIG. 7 according to exemplary embodiments of the present invention.

FIG. 8 is a cross-sectional view taken along a line III-III' in FIG. 7 according to exemplary embodiments of the present invention.

The display apparatus shown in FIG. 7 and FIG. 8 may be substantially the same as the display apparatus described with reference to FIG. 1, except for the display panel. The display panel may be substantially the same as the display panel described with reference to FIG. 3, FIG. 4, FIG. 5, and FIG. 6, except for a shielding voltage pattern SPT and a common voltage line SL of the display panel. Accordingly, further repetitive explanations will be omitted.

Referring to FIG. 7 and FIG. 8, the display substrate may include the first, second, third, fourth, fifth, and sixth pixel areas P1, P2, P3, P4, P5, and P6, the first, second, third, fourth, fifth, and sixth pixel electrodes PE1, PE2, PE3, PE4, PE5, and PE6, shielding voltage patterns SPT, and a first, second, and third common voltage wirings SL1, SL2, and SL3.

The first pixel electrode PE1 may include first high and low electrodes HP1 and LP1. The second pixel electrode PE2 may include a second low electrode LP2 and a second high electrode HP2 disposed diagonally relative to the first high electrode HP1. The third pixel electrode PE3 may include a third low electrode LP3 and a third high electrode HP3 having an inverse alignment with the first pixel electrode PE1. The fourth pixel electrode PE4 may include a fourth low electrode LP4 and a fourth high electrode HP4 disposed diagonally relative to the third high electrode HP3. The fifth pixel electrode PE5 may include a fifth high electrode HP5 and a fifth low electrode LP5 having substantially the same alignment as the first pixel electrode PE1. In addition, the sixth pixel electrode PE6 may include a sixth high electrode HP6 and a sixth low electrode HP6 having substantially the same alignment as the third pixel electrode PE3.

The shielding voltage patterns SPT may be formed in an area between the first high and low electrodes HP1 and LP1 and may partially overlap the first high and low electrodes HP1 and LP1. Each of the shielding voltage patterns SPT may also be formed in areas between the second high and low electrodes HP2 and LP2, between the third high and low electrodes HP3 and LP3, between the fourth high and low electrodes HP4 and LP4, between the fifth high and low electrodes HP5 and LP5, and between the sixth high and low electrodes HP6 and LP6.

The first, second, and third common voltage wirings SL1, SL2, and SL3 may be formed substantially parallel with the m-th and n-th gate lines $GL_m$ and $GL_n$ defining the long sides of the first and third pixel areas P1 and P3. The first common voltage wiring SL1 may be disposed between the m-th and n-th gate lines $GL_m$ and $GL_n$, and may electrically and physically connect the shielding voltage patterns SPT formed in the first and third pixel areas P1 and P3 to each other. The second common voltage wiring SL2 may be disposed between the n-th gate line $GL_n$ and the (n+1)-th gate line $GL_{n+1}$. The second common voltage wiring SL2 may electrically and physically connect the shielding voltage patterns SPT formed in the second and fourth pixel areas P2 and P4 to each other. The third common voltage wiring SL3 may be disposed between the (n+1)-th gate line $GL_{n+1}$ and the (n+2)-th gate line $GL_{n+2}$. The third common voltage wiring SL3 may electrically and physically connect the shielding voltage patterns SPT formed in the fifth and sixth pixel areas P5 and P6 to each other.

On the first substrate 110 of the display substrate in FIG. 7 and FIG. 8, a gate metal layer (not shown) may be disposed and patterned to form a gate pattern including the n-th, (n+1)-th, (n+2)-th, and m-th gate lines $GL_n$, $GL_{n+1}$, $GL_{n+2}$, and $GL_m$, the first to third common voltage wirings SL1, SL2, and SL3, and the shielding voltage patterns SPT.

A source pattern including the x-th, (x+1)-th, (x+2)-th and (x+3)-th data lines $DL_x$, $DL_{x+1}$, $DL_{x+2}$, and $DL_{x+3}$ may be formed on the first substrate 110 including the gate pattern. The first, second, third, fourth, fifth, and sixth pixel electrodes PE1, PE2, PE3, PE4, PE5, and PE6 may be formed on the first substrate 110 including the source pattern thereon. These processes may be substantially the same as the method of manufacturing the display substrate described with reference to FIG. 5 and FIG. 6 hereinabove. Therefore, further repetitive explanations will be omitted.

As described above, the shielding voltage patterns SPT may be formed in the area between the high and low electrodes adjacent to each other, and a common voltage may be applied to the shielding voltage patterns SPT via the first to third common voltage wirings SL1, SL2, and SL3. Accordingly, inflow of the electric field of the first to sixth low electrodes LP1, LP2, LP3, LP4, LP5, and LP6 to the first to sixth high electrodes HP1, HP2, HP3, HP4, HP5, and HP6 may be prevented.

An aperture ratio may be improved using a horizontal stripe type pixel structure defining the long side of the pixel area by gate lines. A viewing angle may be improved by applying different voltages to two transistors connected to one gate line and a pair of data lines. For example, the display of a vertical stripe by low electrodes at a low grayscale, at which a voltage is applied only to high electrodes, may be prevented by arranging, in a zigzag pattern, the high electrodes along an extended direction of the data lines. Therefore, the display apparatus having an improved display quality may be manufactured.

In addition, since the pixel includes the horizontal stripe type structure, the number of data driving chips may be decreased, compared to the number of the data driving chips necessary for driving a display panel including the conventional vertical stripe type pixel structure.

The foregoing is illustrative of the present invention and is not to be construed as limiting thereof. Although a few exemplary embodiments of the present invention have been described, those skilled in the art will readily appreciate that many modifications are possible in the exemplary embodiments without materially departing from the novel teachings and advantages of the present invention. Accordingly, all such modifications are intended to be included within the scope of the present invention as defined in the claims. In the claims, means-plus-function clauses are intended to cover the structures described herein as performing the recited function and not only structural equivalents but also equivalent structures. Therefore, it is to be understood that the foregoing is illustrative of the present invention and is not to be construed as limited to the specific exemplary embodiments disclosed, and that modifications to the disclosed exemplary embodiments, as well as other exemplary embodiments, are intended to be included within the scope of the appended claims.

What is claimed is:

1. A display substrate, comprising:
   a substrate comprising a plurality of pixel areas;
   a first pixel electrode disposed in a first pixel area of the substrate, the first pixel electrode comprising a high electrode and a low electrode, a first side of the first pixel area being defined by a first gate line, at least two sides of the first pixel area being shorter than the first side and being defined by a first data line and a second data line adjacent to the first data line, the high electrode being adjacent to the first data line, the low electrode being adjacent to the second data line;
   a first switching element electrically connected to the first gate line, the first data line, and the high electrode of the first pixel electrode;
   a second switching element electrically connected to the first gate line, the second data line, and the low electrode of the first pixel electrode; and
   a shielding voltage pattern disposed in an area between the low electrode and the high electrode of the first pixel electrode,
   wherein the shielding voltage pattern partially overlaps with the low electrode and the high electrode of the first pixel electrode.

2. The display substrate of claim 1, further comprising:
   a second pixel electrode disposed in a second pixel area of the substrate, the second pixel electrode comprising a low electrode and a high electrode, at least two sides of the second pixel area being defined by the first gate line and a second gate line adjacent to the first gate line, the low electrode being adjacent to the first data line, the high electrode being adjacent to the second data line;

a third switching element electrically connected to the second gate line, the first data line, and the low electrode of the second pixel electrode; and a fourth switching element electrically connected to the second gate line, the second data line, and the high electrode of the second pixel electrode.

3. The display substrate of claim 2, further comprising:
a third pixel electrode disposed in a third pixel area, the third pixel electrode comprising a low electrode and a high electrode, at least two sides of the third pixel area being defined by a third data line adjacent to the second data line and a fourth data line adjacent to the third data line, a first side of the third pixel area being shorter than the at least two sides of the third pixel area and being defined by the first gate line, the low electrode being adjacent to the third data line, and the high electrode being adjacent to the fourth data line;

a fifth switching element electrically connected to the first gate line, the third data line, and the low electrode of the third pixel electrode; and a sixth switching element electrically connected to the first gate line, the fourth data line, and the high electrode of the third pixel electrode.

4. The display substrate of claim 3, wherein each of the low electrodes of the first, second, and third pixel electrodes overlaps the corresponding gate lines and the corresponding data lines surrounding the pixel area wherein the low electrode is disposed.

5. The display substrate of claim 4, wherein each of the low electrodes of the first, second, and third pixel electrodes overlaps a gate line disposed before the gate line connected to the corresponding switching element connected to the low electrode.

6. The display substrate of claim 3, wherein the shielding voltage pattern is disposed in an area between the low electrode and the high electrode of the second pixel electrode and the third pixel electrode, and
wherein the shielding voltage pattern partially overlaps with the low electrode and the high electrode of the second pixel electrode and the third pixel electrode.

7. The display substrate of claim 6, further comprising a common voltage line substantially parallel to the first and second gate lines,
wherein the shielding voltage patterns disposed in the first and third pixel areas are connected to the common voltage line.

8. The display substrate of claim 3, wherein each of the first, second, and third pixel electrodes comprises a micro-slit pattern.

9. The display substrate of claim 3, wherein the first, second, and fifth pixel electrodes are repeatedly arranged along an extended direction of the first, second, third, and fourth data lines.

10. The display substrate of claim 9, wherein the first and third pixel electrodes are repeatedly arranged along an extended direction of the first and second gate lines.

11. The display substrate of claim 1, wherein the plurality of pixel areas comprises a first column of pixel areas disposed along an extended direction of the first data line, each pixel area of the first column of pixel areas comprising a pixel electrode comprising a high electrode and a low electrode, and the high electrodes of the first column of pixel areas are arranged in a zigzag pattern along the extended direction of the first data line.

12. A display apparatus, comprising:
a display substrate comprising:
a first substrate comprising a plurality of pixel areas,
a first pixel electrode disposed in a first pixel area of the first substrate, the first pixel electrode comprising a high electrode and a low electrode, at least two sides of the first pixel area being defined by a first data line and a second data line adjacent to the first data line, at least one side of the first pixel area being longer than the at least two sides of the first pixel area and being defined by a first gate line, the high electrode being adjacent to the first data line, the low electrode being adjacent to the second data line:
a first switching element electrically connected to the first gate line, the first data line, and the high electrode of the first pixel electrode; and
a second switching element electrically connected to the first gate line, the second data line, and the low electrode of the first pixel electrode;
a common electrode layer disposed on a second substrate facing the display substrate; and
a shielding voltage pattern disposed in an area between the low electrode and the high electrode of the first pixel electrode,
wherein the shielding voltage pattern partially overlaps with the low electrode and the high electrode of the first pixel electrode.

13. The display apparatus of claim 12, wherein the display substrate further comprises:
a second pixel electrode disposed in a second pixel area, the second pixel electrode comprising a low electrode and a high electrode, at least two sides of the pixel area being defined by the first gate line and a second gate line adjacent to the first gate line, the low electrode being adjacent to the first data line, the high electrode being adjacent to the second data line;
a third switching element electrically connected to the second gate line, the first data line, and the low electrode of the second pixel electrode; and
a fourth switching element electrically connected to the second gate line, the second data line, and the high electrode of the second pixel electrode.

14. The display apparatus of claim 13, further comprising:
a third pixel electrode disposed in a third pixel area, the third pixel electrode comprising a low electrode and a high electrode, at least two sides of the third pixel area being defined by a third data line adjacent to the second data line and a fourth data line adjacent to the third data line, a first side of the third pixel area being shorter than the at least two sides of the third pixel area and being defined by the first gate line, the low electrode being adjacent to the third data line, the high electrode being adjacent to the fourth data line;
a fifth switching element electrically connected to the first gate line, the third data line, and the low electrode of the third pixel electrode; and
a sixth switching element electrically connected to the first gate line, the fourth data line, and the high electrode of the third pixel electrode.

15. The display apparatus of claim 14, wherein each of the low electrodes of the first, second, and third pixel electrodes overlaps the corresponding gate lines and the corresponding data lines surrounding the pixel area wherein the low electrode is disposed.

16. The display apparatus of claim 14, wherein the shielding voltage pattern is disposed in an area between the low electrode and the high electrode of the second pixel electrode and the third pixel electrode, and wherein the shielding voltage pattern partially overlaps with the low electrode and the high electrode of the second pixel electrode and the third pixel electrode.

17. The display apparatus of claim 14, wherein each of the first, second, and third pixel electrodes comprises a micro-slit pattern.

18. The display apparatus of claim 17, wherein the common electrode layer is disposed on an entire surface of the second substrate.

19. The display apparatus of claim 14, further comprising a gate driving part disposed on the first substrate and electrically connected to the first and second gate lines.

20. The display apparatus of claim 19, further comprising a data driving chip mounted on a base film attached to the display substrate and electrically connected to the first, second, third, and fourth data lines.

21. The display apparatus of claim 12, wherein the plurality of pixel areas comprises a first column of pixel areas disposed along an extended direction of the first data line, each pixel area of the first column of pixel areas comprising a pixel electrode comprising a high electrode and a low electrode, and the high electrodes of the first column of pixel areas are arranged in a zigzag pattern along the extended direction of the first data line.

\* \* \* \* \*